Figure 1:
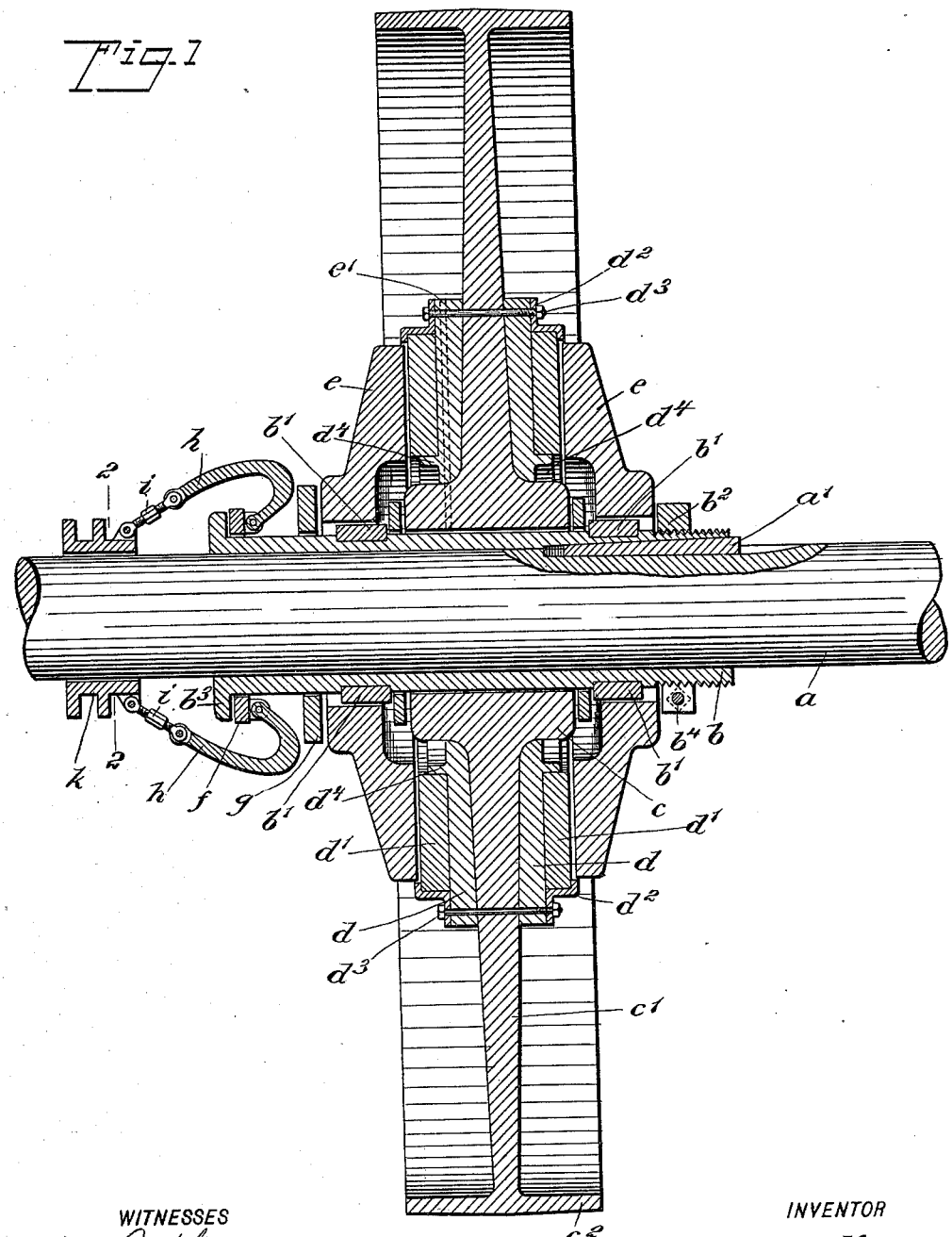

No. 672,800. Patented Apr. 23, 1901.
C. NEWSON.
CLUTCH PULLEY.
(Application filed Nov. 24, 1900.)
(No Model.) 2 Sheets—Sheet 1.

WITNESSES
J. A. Brophy
J. B. Oevens

INVENTOR
Charles Newson
BY Munn
ATTORNEYS

No. 672,800. Patented Apr. 23, 1901.
C. NEWSON.
CLUTCH PULLEY.
(Application filed Nov. 24, 1900.)
(No Model.) 2 Sheets—Sheet 2.
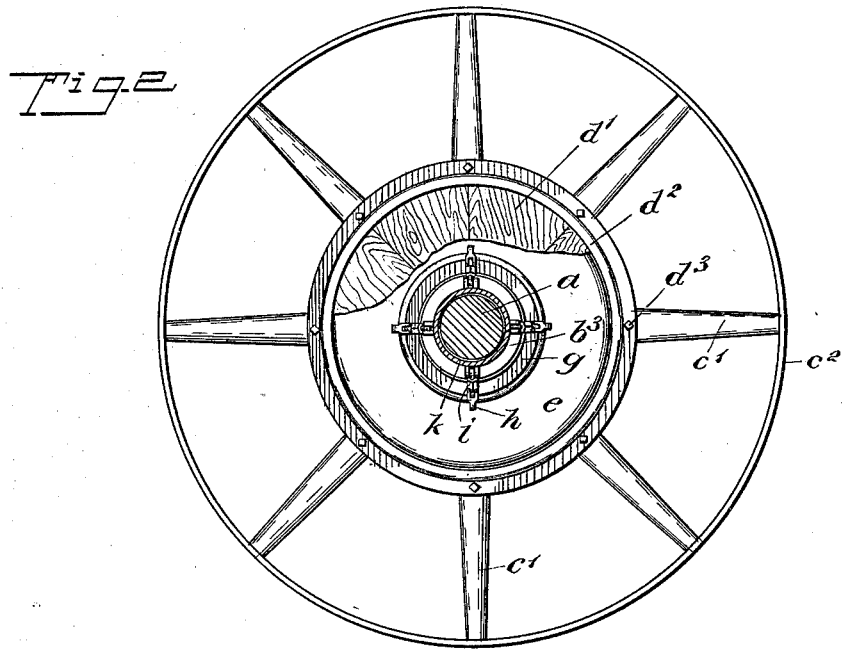
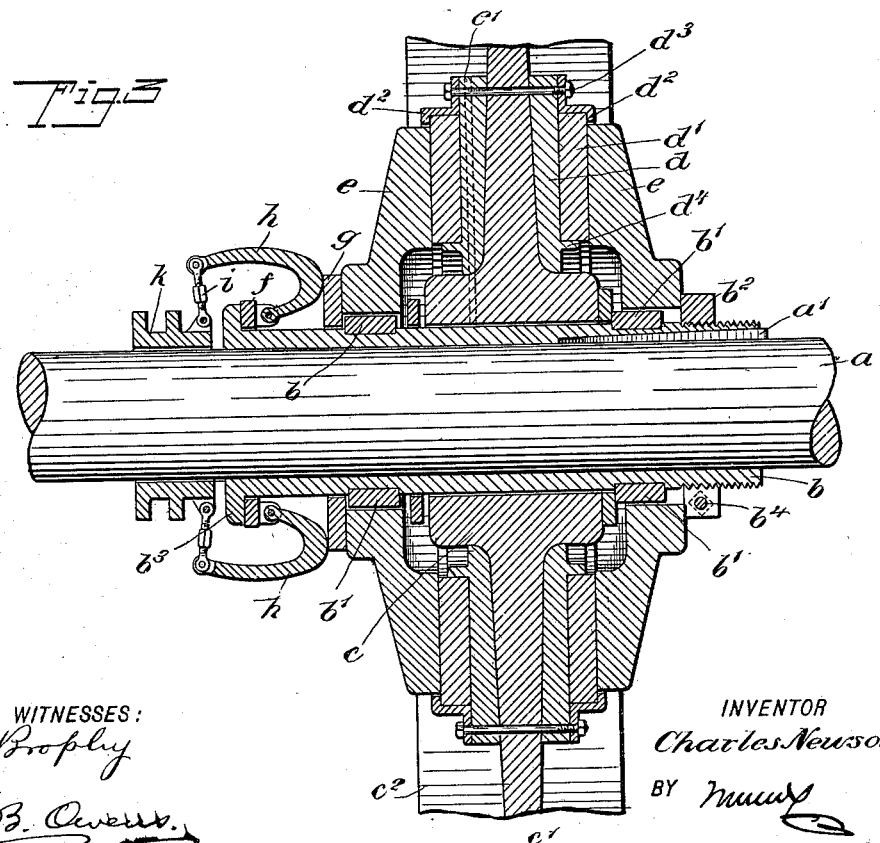
WITNESSES:
INVENTOR
Charles Newson
BY
ATTORNEYS

UNITED STATES PATENT OFFICE.

CHARLES NEWSON, OF PORTLAND, COLORADO.

CLUTCH-PULLEY.

SPECIFICATION forming part of Letters Patent No. 672,800, dated April 23, 1901.

Application filed November 24, 1900. Serial No. 37,617. (No model.)

*To all whom it may concern:*

Be it known that I, CHARLES NEWSON, a citizen of the United States, and a resident of Portland, in the county of Fremont and State of Colorado, have invented a new and Improved Clutch-Pulley, of which the following is a full, clear, and exact description.

This invention relates to a pulley normally loose on its shaft and provided with certain novel clutch mechanism for rendering it fast to the shaft when desired.

This specification is a specific description of one form of my invention, while the claims are definitions of the actual scope thereof.

Reference is to be had to the accompanying drawings, forming a part of this specification, in which similar characters of reference indicate corresponding parts in all the views.

Figure 1 is a sectional view of the invention, showing the clutch relaxed. Fig. 2 is a sectional elevation on the line 2 2 of Fig. 1; and Fig. 3 is a section similar to Fig. 1, except that the clutch is shown in active position.

$a$ represents the shaft, and $b$ a sleeve which is splined thereon by a key $a'$, permitting the sleeve to slide, but not to turn independently of the shaft. On the sleeve $b$ is mounted loosely the hub $c$ of the pulley.

$c'$ represents the spokes or web of the pulley, and $c^2$ the rim or face thereof.

To the web or spokes $c'$ of the pulley are fastened two body plates or disks $d$, which lie around the hub and which carry wooden shoes $d'$, these shoes being removably fastened in place by clamping-rings $d^2$, held in turn by bolts $d^3$. When the wooden shoes $d$ are worn out by the constant friction thereon, they may be removed and replaced by new shoes. The inner edges of the body-plates $d$ are provided with annular ribs $d^4$, against which the inner edges of the shoes $d'$ bear, as shown in Figs. 1 and 3.

On the sleeve $b$ are splined clutch members $e$ by means of keys $b'$, carried by the sleeve, the clutch members $e$ being located one at each side of the pulley to work, respectively, with the sets of shoes $d$. At the right-hand end of the sleeve $b$ a lock-nut or clamp $b^2$ is carried, said lock-nut or clamp being threaded on the sleeve and being adapted to work against the corresponding clutch member to take up any wear that may occur owing to the action of the various parts against each other. The lock-nut or clamp $b^2$ is preferably split and is held in place when adjusted on the sleeve $b$ by means of a bolt or screw $b^4$ passing through ears or lugs on the lock-nut or clamp and provided with a suitable nut, as shown in Figs. 1 and 3. At the other end of the sleeve $b$ a collar $b^3$ is formed, and this end of the sleeve carries two rings $f$ and $g$. To the ring $f$ cam-levers $h$ are fulcrumed, these cam-levers being arranged to bear against the ring $g$ and force the same to the right in the manner illustrated in Fig. 3, thus pushing the left-hand clutch member $e$ against its corresponding shoes and drawing the sleeve $b$ to the left, causing the right-hand clutch member also to engage its corresponding shoes, and thereby fixing the pulley on the sleeve and shaft. The cam-levers $h$ are connected by links $i$ with a collar $k$, mounted loosely on the shaft and adapted to be engaged by a clutch-lever, so that the collar $k$ may be thrown from the position shown in Fig. 1 to that shown in Fig. 3, and vice versa.

To render the pulley fast on the shaft, the collar $k$ is thrown to the right, as shown in Fig. 3, thus raising the outer ends of the cam-levers $h$ and forcing the curved portion of the cam-levers against the ring $g$, thereby pushing the ring $g$ against the adjacent clutch member and drawing the sleeve $b$ so as to apply the other member to the pulley. This fastens the pulley on the shaft. To release the pulley, the above operation is reversed. When the pulley is at rest, the shaft turns, carrying the sleeve $b$ and also carrying the clutch members $e$; but the other parts of the apparatus are at a standstill, and therefore it is possible to repair various of these parts without stopping the movement of the shaft, which is obviously a great advantage of the invention. Various other advantages are attained by this construction, as will be apparent, and it is not necessary for me to specify them here. An oil-duct $e'$ is also provided for lubricating the pulley when at rest.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. In a clutch-pulley, the combination with the shaft and pulley, of a sleeve splined on the shaft and loosely carrying the pulley, clutch members mounted on the sleeve at each side of the pulley, one of the clutch members having connection with the sleeve to be moved upon the longitudinal movement thereof, and means working between the other clutch member and the sleeve for pressing said parts to cause both clutch members to engage the pulley.

2. In a clutch-pulley, the combination with the shaft and pulley, of a sleeve splined on the shaft and loosely carrying the pulley, a clutch member carried at one end of the sleeve and engaging one side of the pulley, a clutch member carried on the sleeve at the other side of the pulley, one of the clutch members being connected to move longitudinally with the sleeve, and means working between the other clutch member and the adjacent end of the sleeve to move the two apart, for the purpose specified.

3. In a clutch-pulley, the combination with the shaft and pulley, of a sleeve splined on the shaft and loosely carrying the pulley, a clutch member carried at one end of the sleeve to turn therewith and also to move longitudinally with the sleeve to engage one side of the pulley, a clutch member carried on the sleeve at the other side of the pulley to turn with the sleeve and movable longitudinally independently of the pulley, and a cam-lever arranged to work between the second-named clutch member and the adjacent end of the sleeve, to move them apart, for the purpose specified.

4. In a clutch-pulley, the combination with a shaft, of a sleeve splined thereon, a pulley mounted loosely thereon, clutch members carried on the sleeve and engaging the shaft, a ring mounted loosely on one end of the sleeve, and a cam-lever fulcrumed on said ring and adapted to communicate pressure to the adjacent clutch member to apply the clutch members in the manner specified.

5. In a clutch-pulley, the combination of a shaft, a sleeve splined thereon, a pulley loosely mounted on the sleeve, clutch members carried by the sleeve to engage opposite sides of the pulley, a ring mounted loosely on one end of the sleeve, a cam-lever fulcrumed on the ring and adapted to communicate pressure to the adjacent clutch member to apply the clutch in the manner specified, a collar sliding on the shaft, and a link forming a connection between the cam-lever and the collar, to operate the cam-lever.

6. In a clutch-pulley the combination of a shaft, a sleeve splined on the shaft, a pulley mounted loosely on the sleeve, clutch members carried on the sleeve respectively at the sides of the pulley, one of the clutch members being connected with the sleeve to move therewith against the pulley, and means acting between the other clutch member and the sleeve to force the clutch members against the pulley.

In testimony whereof I have signed my name to this specification in the presence of two subscribing witnesses.

CHARLES NEWSON.

Witnesses:
SHERIDAN H. SMITH,
W. H. ASH.